United States Patent [19]

Baardson

[11] 4,326,382
[45] Apr. 27, 1982

[54] POWER PLANT

[75] Inventor: Andrew B. Baardson, Black Butte Ranch, Sisters, Oreg. 97759

[73] Assignees: E. H. Robbins, Eugene; Andrew B. Baardson, Sisters, both of Oreg.

[21] Appl. No.: 200,543

[22] Filed: Oct. 24, 1980

[51] Int. Cl.³ .................................................. F01K 23/04
[52] U.S. Cl. ......................................... 60/655; 60/683
[58] Field of Search ................ 60/655, 672, 676, 681, 60/683, 750; 431/115

[56] References Cited

U.S. PATENT DOCUMENTS

| | | |
|---|---|---|
| 2,379,452 | 7/1945 | Nettel et al. |
| 2,404,938 | 7/1946 | Armacost et al. |
| 2,434,950 | 1/1948 | Nettel et al. |
| 2,471,755 | 5/1949 | Karrer ................................. 60/655 |
| 2,478,851 | 9/1949 | Traupel |
| 2,486,291 | 10/1949 | Karrer ................................. 60/655 |
| 2,583,430 | 1/1952 | Kadenacy |
| 2,691,271 | 10/1954 | McDevitt |
| 2,707,239 | 4/1955 | Riehl |
| 3,007,306 | 11/1961 | Martin et al. ....................... 60/655 |
| 3,064,417 | 11/1962 | Tryhorn et al. |
| 3,096,615 | 7/1963 | Zuhn |
| 3,672,160 | 6/1972 | Kim |
| 3,789,807 | 2/1974 | Pinkerton |
| 3,831,535 | 8/1974 | Baardson |
| 3,837,303 | 9/1974 | Baardson |
| 3,934,418 | 1/1976 | DeBaun |
| 4,008,574 | 2/1977 | Rein |
| 4,112,683 | 9/1978 | Beas |
| 4,116,005 | 9/1978 | Willyoung |
| 4,164,124 | 8/1979 | Taylor |

OTHER PUBLICATIONS

Solar Turbines International paper entitled "Indirectly Heated Gas Turbine for Advanced Cogeneration Systems," dated 1979.

Primary Examiner—Allen M. Ostrager
Assistant Examiner—Stephen F. Husar
Attorney, Agent, or Firm—Klarquist, Sparkman, Campbell, Leigh, Whinston & Dellett

[57] ABSTRACT

An indirect gas turbine power plant is provided which includes primary and secondary combustors wherein fuel is burned and heat is conveyed to a turbine working medium which is subsequently passed through the turbine section of a gas turbine. The gas turbine includes both a compressor section and a turbine section. The primary combustor has a first inlet for receiving exhaust air from the turbine section, a second inlet for receiving fuel and an outlet for the discharge of products of combustion. The secondary combustor includes a first inlet for receiving at least a portion of the products of combustion from the primary combustor, a second inlet for receiving a portion of the products of combustion of the secondary combustor, and an outlet for the discharge of the products of combustion of the secondary combustor. An air heat exchanger for conveying heat from the products of combustion to the compressed air is positioned within the secondary combustor. This heat exchanger includes an inlet for receiving compressed air from the compressor section of the gas turbine, and an outlet to direct the compressed, hot air out of the secondary combustor for passage to the turbine section.

19 Claims, 2 Drawing Figures

POWER PLANT

BACKGROUND AND SUMMARY OF THE INVENTION

This invention relates generally to power plants. More specifically, the invention relates to an improved heat source for use in indirect gas turbine power plants.

In so-called direct gas turbine power plants, the products of combustion, including any unburned fuel, actually pass through the turbine. Because of this, only very clean fuels, such as natural gas and other distillate fuels, can be used in order to prevent damage to the turbine blading. The products of combustion of less refined fuels, such as biomass, coal or wood wastes, cannot be directly used to fuel a gas turbine since the gaseous products of combustion of these fuels often contain particulates which may destroy or cause undue wear of the expansion section of a gas turbine. Moreover, these less refined fuels often provide an insufficient degree and rate of expansion within the gas turbine, thereby seriously limiting the energy output of the turbine.

Given the dwindling supply of fossil fuels, it is imperative that maximum use of all types of fuels be achieved. In order to make use of lower-grade fuels in so-called indirect gas turbine power plant systems, a turbine working fluid, such as air, is utilized to absorb heat from the fuel via various types of heat exchangers. The working fluid and the heat contained therein is subsequently passed through the turbine in order to generate electrical and/or mechanical power. Since the products of combustion do not actually pass through the gas turbine, these indirect systems permit the use of fuels such as biomass, coal and wood wastes. As used herein, the term "biomass" is intended to define any type of combustible plant material, including organic fibrous materials such as sewer sludge. The term "wood wastes" defines wood materials such as bark, shavings, trimmings, chips, sawdust, hog fuel, and the like which are typically by-products of various operations performed at a lumber mill. Biomass, coal and wood wastes are typically in particulate form when they are to be used as fuel in a suspension burner.

One serious disadvantage of conventional indirect systems is that a considerable amount of energy is lost in attempting to transfer heat from the burning fuel to the turbine working fluid. Many suggestions have been made to increase heat transfer efficiency in such indirect systems. For example, heat exchangers have been placed inside high temperature combustion chambers, where they are subjected to the heat of ongoing combustion. One such system is disclosed in U.S. Pat. No. 2,434,950 to Nettel. Nettel also includes a second heat exchanger positioned remote from the combustion chamber in an attempt to absorb additional heat from the products of combustion leaving the combustion chamber. The term "products of combustion" as used herein is intended to cover not only the exhaust gases which result from combustion of fuel, but also gaseous combustibles in the form of vapors which may emanate from liquid or solid fuels, and air, which, for various reasons, has not been used up in combustion. Nettel also suggests that the products of combustion might be combined with hot air exhausted from the turbine to form a stream which is then fed back to the combustion chamber as combustion air. While Nettel's system is undoubtedly more efficient than some other designs, he overlooks the fact that the fuel is not going to be completely burned in his single combustion chamber. For example, as noted above, combustible (and therefore energy-containing) gases will typically be emitted with the exhaust gases from this combustion chamber. Therefore, Nettel's system inherently wastes fuel which will eventually pass to the atmosphere with the other products of combustion. A second drawback with Nettel's system is that he positions a heat exchanger within his primary combustion chamber. This requires the use of exotic and therefore expensive materials since the heat exchanger will be subjected to extremely high temperatures.

The present invention overcomes these disadvantages in Nettel's and other prior art systems by providing a unique arrangement of a secondary combustion chamber having a heat exchanger therein. The use of secondary combustion chambers per se is not new. For example, my earlier U.S. Pat. No. 3,831,535 discloses a so-called blending chamber which receives products of combustion from a primary combustion chamber, and continues to burn those products of combustion along with recirculated volatile fumes which provide additional fuel to the blending chamber. However, neither the system disclosed in my aforementioned patent, nor any other prior systems, include the unique features found in the present invention which permit greater efficiency than previously thought possible.

It is therefore an object of the present invention to increase the efficiency of combustion systems utilizing biomass, coal, wood wastes, and other types of fuels, for use with power plants, compressors, or other engines. Another object is to provide a power plant system wherein temperatures throughout the system are easily controllable in order to maximize the efficiency of the system and to maintain the desired output temperatures and pressures. Yet another object is the provision of a system in which the primary combustion chamber is maintained at an optimum temperature for a more complete combustion of particulate fuels. Another object is to utilize energy derived from the combustion of wood wastes and other fuels to generate electricity using a conventional gas turbine, air to air heat exchanger, and electrical generator. A more specific object is to provide a power plant system especially adapted for optimum utilization of the potential heat energy from the combustible wood wastes of a lumber or plywood mill to generate electricity for powering both in-plant and out-of-plant apparatus.

This invention responds to the problems presented in the prior art by providing an indirect gas turbine power plant having primary and secondary combustors wherein fuel is burned and heat is conveyed to a turbine working medium which is subsequently passed through the turbine section of a gas turbine. The gas turbine includes both a compressor section and a turbine section. The primary combustor has a first inlet for receiving exhaust air from the turbine section, a second inlet for receiving fuel and an outlet for discharge of products of combustion. The secondary combustor includes a first inlet for receiving at least a portion of the products of combustion from the primary combustor, a second inlet for receiving a portion of the products of combustion of the secondary combustor, and an outlet for discharge of the products of combustion of the secondary combustor. A gas-to-gas heat exchanger, hereinafter referred to as an air heat exchanger, is positioned within the secondary combustor. This heat exchanger includes an inlet for receiving compressed air from the compressor section of the gas turbine, heat exchange surface means for conveying heat from the products of combustion to the compressed air, and an outlet to direct the compressed, hot air out of the secondary combustor for passage to the turbine section of the gas turbine. First conduit means are also included for conveying a portion of the products of combustion from the secondary combustor outlet to the second inlet of the secondary combustor. This first conduit may, if desired, direct the secondary combustor products of combustion through a boiler or other heat use before conveying the products of combustion back to the secondary combustor. Also, the first conduit may be adapted to receive other energy inputs such as hot exhaust air or other gases which would be combined with the secondary combustor products of combustion prior to reinjection back into the secondary combustor.

The invention also normally includes a boiler having inlet means for receiving hot gases which include exhaust air from the turbine section of the gas turbine and the products of combustion of the secondary combustor, outlet means for discharging the hot gases, and steam generation means for conveying heat from the hot gases to water within the boiler and thereby generating steam.

It may be desirable in certain systems to eliminate the gas turbine from the power plant. In such systems the compressed, hot air which is discharged from the secondary combustor air heat exchanger can be directed to energy absorption means which would use a portion of the energy contained in such air and pass the remainder to the primary combustor for use as combustion air, to a boiler, or to both the primary combustor and a boiler. Such energy absorption means might typically comprise a dehydrator for food processing and the like, a glass production facility, or any other use which requires substantial amounts of heat energy. Of course, when the gas turbine is eliminated from the system, the air compressor would be driven by other means.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
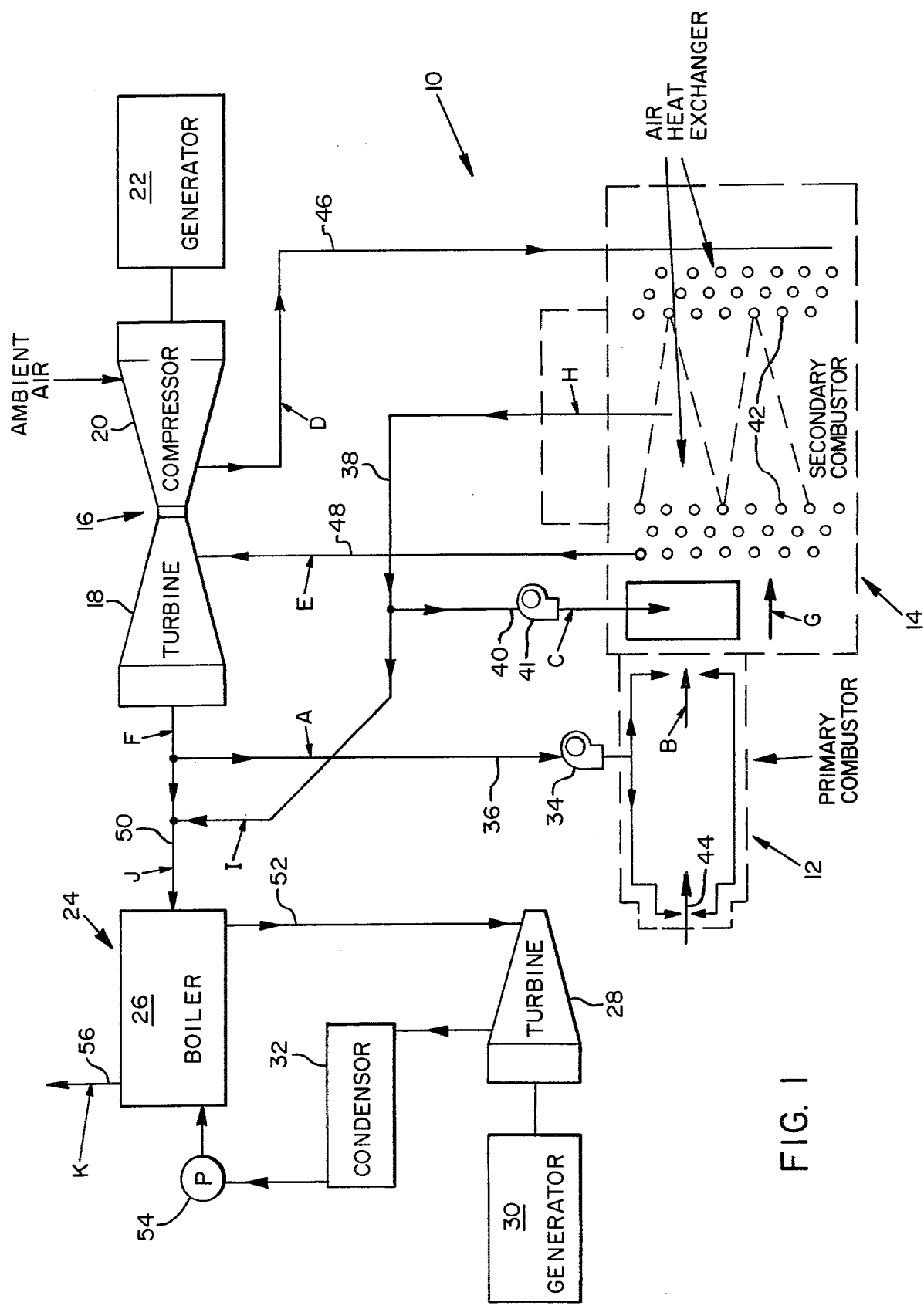
FIG. 1 is a schematic drawing of a first embodiment of the present invention.

The principles of this invention are particularly useful when embodied in an indirect gas turbine power plant such as that illustrated in FIG. 1, generally indicated by the numeral 10. FIG. 1 is merely a schematic of the system, showing the flow of fluids through the power plant 10. The system includes a primary combustor 12, a secondary combustor 14 and a gas turbine 16. The gas turbine 16 includes a turbine section 18 and a compressor section 20, and is adapted to provide a power drive for any conventional use. For example, in the depicted embodiment gas turbine 16 is drivingly connected to a first electrical generator 22. The power plant 10 also normally includes a boiler system 24. This boiler system 24 includes a boiler 26 which provides steam to drive a steam turbine 28. The steam turbine 28, is, in turn, drivingly connected to a second electrical generator 30. A steam condenser 32 is included in the boiler system 24 in order to recover and condense the steam.

The working fluid for primary turbine 16 is air, and therefore power plant 10 can be described as an indirect system. As discussed previously, this distinguishes it from a direct system in which products of combustion actually pass through gas turbine 16 as the working fluid. The power plant thus has the capability of utilizing low-grade particulate or other fuels.

FIG. 1 includes a plurality of letters identifying various points in the power plant 10. These letters will be used in Chart A below to identify the conditions of the fluids in the system at these points. Chart A lists specific heat (Sp), temperature (°F.), mass flow (pounds per hour), and Btu. In the ensuing discussion, reference will be made only to the temperature of the fluid, but the remainder of the conditions can be ascertained by reference to Chart A. It should be appreciated that these values are based upon theoretical calculations, and in actual practice may be somewhat different than the listed values.

CHART A

| Position | Sp | Temp. (°F.) | Mass Flow (Lbs./Hr.) | Btu |
|---|---|---|---|---|
| A | .247 | 795 | 85,768 | 15,592,030 |
| B | .268 | 2400 | 90,168 | 56,570,647 |
| C | .25 | 1027 | 87,322 | 21,131,924 |
| D | .244 | 600 | 136,800 | 18,058,147 |
| E | .258 | 1600 | 136,800 | 54,388,670 |
| F | .247 | 795 | 136,800 | 24,869,145 |
| G | .261 | 1800 | 171,000 | 77,702,571 |
| H | .25 | 1027 | 171,000 | 41,372,048 |
| I | .25 | 1027 | 83,678 | 20,240,124 |
| J | .248 | 943 | 134,710 | 29,517,239 |
| K | .241 | 300 | 134,710 | 7,824,091 |

The power plant depicted in FIG. 1 includes a combustion air blower 34 which receives exhaust air from gas turbine 16 via an exhaust air conduit 36, and directs this air into primary combustor 12. This exhaust air is under pressure and is heated to approximately 795° F. (see Position A in Chart A). Therefore, it will increase the efficiency of combustion air in primary combustor 12 and will provide excess air to support combustion in the secondary combustor 14.

As shown schematically in FIG. 1, combustion air is preferably directed into primary combustor 12 at two points along its length, i.e., one adjacent a burner 44, and the other in the vicinity of the other end of primary combustor 12. One way to do this is to provide an annular jacket (not shown) surrounding primary combustor 12 with apertures therein leading into the primary combustor to permit combustion air to flow therethrough at the desired points. Combustion air is thus directed into primary combustor 12 in a radial direction from several aligned apertures positioned around the periphery of the primary combustor. This arrangement provides an adequate amount of air at the burner 44, thus resulting in a highly efficient, lean flame without producing ash or other by-products, and also serves to prevent excessive temperatures in the primary combustor. This is desirable in order to prevent the formation of silica within primary combustor 12 and to prevent excessive temperatures in secondary combustor 14 for purposes to be described hereinbelow. When combustion air is introduced in this fashion, it has been found that the use of 100 to 200% excess air provides for particularly efficient combustion in both the primary and secondary combustors.

As noted at Position B, the temperature in primary combustor 12 is typically 2400° F., although it may be lower under some operating conditions. The 2400° F. reading is based upon a fuel feed of 4400 pounds of particulate wood waste, conveyed in an airstream at ambient temperature.

The combustion taking place in secondary combustor 14 is that of the combustible vapors and gases produced during the burning of the particulate fuel in primary combustor 12. That is, the particulates themselves are normally fully burned in primary combustor 12. However, as noted above, the combustion of the particulate fuel results in the rendering of substantial amounts of gaseous combustibles. These combustibles begin to burn immediately as they are produced, and continue to burn as they pass into the secondary combustor 14.

Upon entering secondary combustor 14, the gaseous combustibles are mixed with products of combustion which have been recirculated from a secondary combustor discharge conduit 38 via a recirculation conduit 40 and a recirculation blower 41. As mentioned previously, the secondary combustor products of combustion may, in certain systems, be utilized elsewhere prior to being recirculated back to secondary combustor 14. Moreover, hot exhaust air and/or gases from elsewhere in the system may be directed into recirculation conduit 40 upstream of the secondary combustor to utilize any heat in such gases and to burn any gaseous combustibles contained therein. As shown in FIG. 1, only a portion of the secondary combustor products of combustion are recirculated, in order to prevent a build up of pressure in secondary combustor 14 and to provide heat-containing secondary combustor products of combustion to other parts of the power plant 10. As noted on Chart A at Position C, the recirculated products of combustion enter secondary combustor 14 at 1027° F.

There are three basic reasons for recirculating the secondary combustor products of combustion. First, it results in a virtual elimination of the passage of combustible (and therefore energy-containing) gases out of the power plant 10. It is obviously of great value to get the most energy out of fuel, regardless of the type used. However, complete combustion has been a particularly serious problem with low-grade combustibles, such as biomass, coal and wood wastes. The second basic reason for recirculating secondary combustor products of combustion is to lower the temperature of the products of combustion emanating from primary combustor 12 which, as previously indicated, may be as hot as 2400° F. A lower temperature is desirable because an air heat exchanger 42 is positioned within secondary combustor 14. Subjecting the air heat exchanger 42 to temperatures approximating 2400° F. would tend to shorten its life unless it were made of special, high-temperature, exotic materials which would be prohibitively expensive. The third reason for recirculating secondary combustor products of combustion is to make further use of the heat contained within those gases.

The air heat exchanger is schematically depicted in FIG. 1 as comprising a plurality of helically disposed tubes which generally define a cylinder through which the products of combustion are directed. The air heat exchanger 42 may, however, be of any other conventional design which maximizes transfer of heat from the products of combustion to the air passing through the air heat exchanger. Air heat exchanger 42 is adapted to receive compressed (and therefore heated) air from the compressor section 20 of the gas turbine 16 via a compressed air conduit 46. As indicated at Position D on Chart A, air passing through compressed air conduit 46 into air heat exchanger 42 is at 600° F. The air is discharged from air heat exchanger 42 through a hot air conduit 48 at 1600° F. (see Position E). These readings are based upon an ambient air intake at compressor section 20 of 30,324 cubic feet per minute at 59° F.

When the compressed, hot air enters turbine section 18 of gas turbine 16, it impinges upon turbine blades to drive the gas turbine and the first electrical generator 22 connected thereto. Under the indicated conditions, first electrical generator 22 puts out 2630 kilowatts (kw) thus providing a first energy output from power plant 10.

The air which exhausts from gas turbine 16 is expanded, but still retains heat. As noted at Position F, this air is typically at 795° F. As previously mentioned, a portion of this hot exhaust air passes through air conduit 36 to provide excess combustion air to primary combustor 12. The rest of the exhaust air is sent via turbine air discharge conduit 50 to boiler 26. Prior to the point conduit 50 enters boiler 26, it is joined with secondary combustor discharge conduit 38 carrying products of combustion from secondary combustor 14. As previously discussed, these products of combustion will include only very small amounts of gaseous combustibles, virtually all of these gases being burned in secondary combustor 14. As noted at Position I, the secondary combustor products of combustion will typically be at 1027° F. Once the secondary combustor products of combustion mix with the exhaust air from gas turbine 16, the resulting hot gases enter boiler 26 at a temperature of 943° F., as noted at Position J.

Due to the high temperature of the secondary combustor products of combustion, it is desirable that secondary combustor discharge conduit 38 be well insulated. It may be desirable in certain systems to run this conduit underground between secondary combustor 14 and boiler 26, thereby using the ground as an insulator. Alternatively, it may be desirable to utilize conventional conduit insulation.

Boiler 26 is of the water-tube type adapted to generate steam by conveying heat from the previously-mentioned hot gases to water in the boiler tubes. Under the indicated conditions boiler 26 typically operates at 300 psi, producing 21,564 pounds of steam per hour having 1202 Btu per pound. This steam is directed through a steam outlet conduit 52 to steam turbine 28 which drives second electrical generator 30. Under these conditions, the steam turbine can be expected to operate at 61% efficiency, producing 945 kw from second electrical generator 30. This thus provides a second energy output from power plant 10.

The steam from second electrical generator 30 is subsequently directed to condenser 32 where the steam is condensed. Alternatively, the steam may be directed to other stations for further use prior to condensation. Once condensed, the condensate is pumped back into boiler 26 by a feed pump 54. At this point the condensate typically contains 196 Btu per pound.

The hot gases (made up of turbine exhaust air and products of combustion) which are discharged from boiler 26 through boiler discharge conduit 56 are still at a temperature of about 300° F. (see Position K). Therefore, they are still usable for any conventional purpose. For example, if power plant 10 is being utilized in a lumber mill, these gases may be fed to a rotary drier (not shown) where wood is dried. Thus, a third energy output is provided by the power plant.

It may be desirable to position a blower (not shown) in boiler discharge conduit 56 in order to regulate the flow of the hot gases from boiler 26. However, regardless of whether or not a boiler discharge conduit blower is included, blowers 34 and 41 and pump 54 serve to control the flow of fluids through power plant 10 to maximize efficiency of the system.

Figure 2:
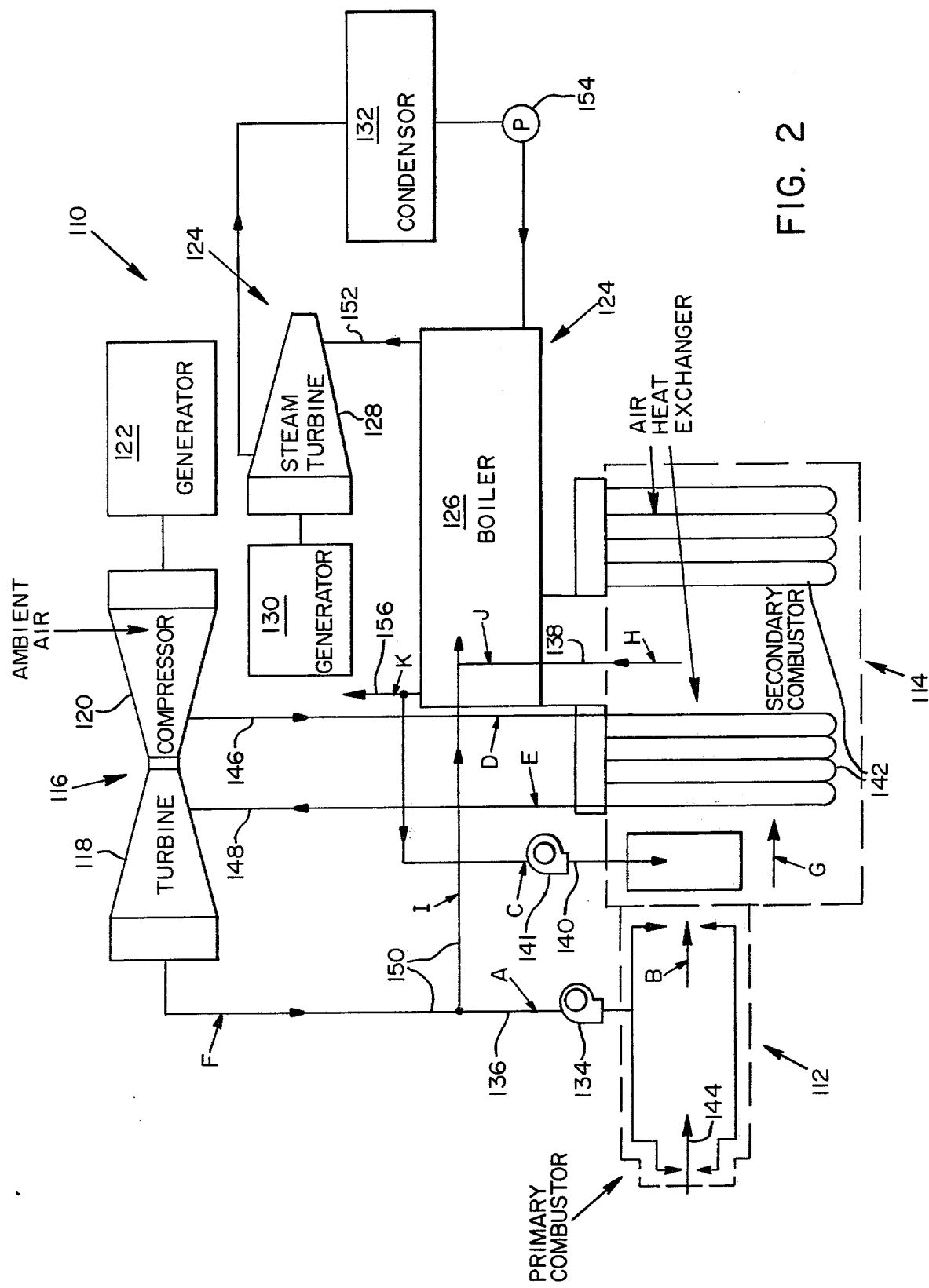
FIG. 2 is a schematic drawing of a second embodiment of the present invention.

A second embodiment of the present invention is schematically depicted in FIG. 2. Since many of the components of this second embodiment correspond to components in the previously-described power plant 10, corresponding numerals will be used to designate the system in FIG. 2, except that the numeral 1 will be added to each designation. For example, the system generally is identified with the numeral 110.

Power plant 110 includes a primary combustor 112, a secondary combustor 114, and a gas turbine 116. The gas turbine 116 includes a turbine section 118 and a compressor section 120 and is adapted to provide power drive for conventional uses, such as the generation of electricity. Therefore, a first electrical generator 122 is depicted in FIG. 2. Power plant 110 also normally includes a boiler system 124 having a boiler 126 which provides steam to drive a steam turbine 128. The steam turbine is drivingly connected to a second electrical generator 130. A steam condenser 132 is included in the boiler system 124 to complete the system. Like the previously-described power plant 10, power plant 110 is an indirect system utilizing a turbine working fluid, here air, to convey energy from the fuel to gas turbine 116. Chart B lists theoretical conditions of the fluids in power plant 110 in the same fashion as described previously with respect to power plant 10.

CHART B

| Position | Sp | Temp. (°F.) | Mass Flow (Lbs./Hr.) | Btu |
|---|---|---|---|---|
| A | .2538 | 710 | 92,597 | 15,299,228 |
| B | .2913 | 2400 | 97,962 | 66,803,549 |
| C | .2438 | 350 | 65,585 | 4,652,980 |
| D | .2505 | 590 | 136,800 | 18,196,520 |
| E | .2752 | 1450 | 136,800 | 52,367,472 |
| F | .2538 | 710 | 136,800 | 22,602,615 |
| G | .279 | 1625 | 163,547 | 71,455,973 |
| H | .260 | 936 | 163,547 | 37,291,986 |
| I | .2538 | 710 | 44,203 | 7,303,387 |
| J | .258 | 856 | 208,363 | 46,001,248 |
| K | .2438 | 350 | 142,778 | 10,129,499 |

Power plant 110 includes a combustion air blower 134 which provides combustion air to primary combustor 112. A conduit 136 leads from turbine section 118 of gas turbine 116 to the inlet of combustion air blower 134 so that the hot exhaust air from the turbine is blown into primary combustor 112. The exhaust air is typically at a temperature of 710° F. (see Position A), thereby increasing the efficiency of combustion in primary combustor 112.

Combustion air is introduced into primary combustor 112 in the same fashion as described with respect to power plant 10; that is, at two points along its length, one adjacent a burner 144 and the other adjacent secondary combustor 114. As with power plant 10, an annular jacket (not shown) is preferably utilized so that combustion air can be directed into primary combustor 112 in a radial direction from a plurality of aligned apertures positioned around the periphery of the primary combustor. As discussed earlier with respect to power plant 10, the use of 100 to 200% excess air provides for particularly efficient combustion in both the primary and secondary combustors. It should be appreciated, however, that under certain conditions it may be desirable to use a greater or lesser amount of excess air. Ideally, the particulate fuel is fully burned in primary combustor 112. This combustion, in combination with the excess air, supports combustion of the gaseous combustibles which have been rendered from the particulate fuel. This combustion continues as the products of combustion pass into secondary combustor 114. In the depicted embodiment it has been found that when air is utilized as a vehicle, the primary combustor typically can be fed at a rate of 5365 pounds of fuel per hour. This feed rate provides a primary combustor temperature of 2400° F. (see Position B).

As the burning gaseous combustibles pass into secondary combustor 114 they are mixed with products of combustion which have been recirculated from a boiler discharge conduit 156 via a recirculation conduit 140 and a recirculation blower 141. Preferably only a portion of the products of combustion leaving boiler 126 are recirculated, in order to prevent excessive pressures in secondary combustor 114 and to provide heat-containing products of combustion to other part of power plant 110. The reasons for recirculation of the products of combustion from boiler 126 are basically the same as those stated above for power plant 10; that is, to ensure virtually total combustion of the gaseous combustibles, to lower the temperature within secondary combustor 114, and to make further use of the heat contained in the products of combustion emanating from the boiler. The introduction of recirculated products of combustion from boiler 126 (at a temperature of 350° F. as noted at Position C) cools the products of combustion entering secondary combustor 114 to approximately 1625° F. as noted at Position G. Passing the secondary combustor products of combustion through boiler 126 prior to recirculation back to secondary combustor 114 increases the efficiency of the power plant. To this extent, the design of power plant 110 is preferable to that of power plant 10.

As mentioned previously with respect to power plant 10, exhaust air and/or gases from elsewhere in the system may be directed into recirculation conduit 140 upstream of the secondary combustor to utilize any heat in such gases and to burn any gaseous combustibles contained therein.

The depicted air heat exchanger 142 is of conventional design, utilizing a plurality of U-shaped tubes to provide the desired number of passes. It should be understood, however, that it may be desirable in some applications to utilize any other conventional design such as the helical-shaped tubes shown in FIG. 1. The air heat exchanger 142 receives compressed air from compressor section 120 of gas turbine 116 via a compressed air conduit 146. As noted at Position D, this compressed air will typically be heated to 590° F. during compression, based upon an ambient air intake at the compressor of 30,324 cubic feet per minute at 59° F.

After passing through air heat exchanger 142, the compressed, hot air is directed to turbine section 118 of gas turbine 116 via hot air conduit 148. As indicated at Position E, this air is normally at 1450° F. Upon entering the gas turbine 116 the air impinges upon turbine blades, thereby driving the gas turbine and the first electrical generator 122 mounted thereto. This typically generates 2100 kw, thus providing a first energy output from power plant 110.

Turbine air discharge conduit 150 directs the exhaust air from gas turbine 116 toward boiler 126. While this air is expanded, it still typically retains a temperature of 710° F. (see Position F). As previously discussed, a portion of the exhaust air passes through air conduit 136 to provide excess combustion air to primary combustor 112. The remainder of the exhaust air is sent to boiler 126 via turbine air discharge 150, which converges with the secondary combustor discharge conduit 136 conveying products of combustion from secondary combustor 114. As previously discussed in connection with power plant 10, these products of combustion include only very small amounts of gaseous combustibles, virtually all of these gases being burned in secondary combustor 114. At this point (identified by Position H) the products of combustion are at 936° F. When the exhaust air from gas turbine 116 and the products of combustion from secondary combustor 114 merge, the resulting hot gases are at 856° F. (see Position J).

Boiler 126, like boiler 26 of power plant 10, is of conventional water-tube type, adapted to generate steam at 400 psi by conveying heat from the hot gases (comprised of turbine exhaust air and products of combustion) to water in the boiler tubes. Boiler 126 typically produces 26,774 pounds of steam per hour with 1362 Btu per pound. This steam is directed through a steam outlet conduit 152 to steam turbine 128. The steam turbine 128 typically operates at an efficiency of 65% and drives the second electrical generator 130, normally producing 2556 kw. This provides a second energy outlet from the power plant 110. The steam from steam turbine 128 is subsequently directed to condenser 132 where the steam is condensed. Alternatively, the steam may be directed to other stations for further use prior to condensation. Once condensed, the condensate, containing 196 Btu per pound, is pumped back into boiler 126 by a feed pump 154.

A portion of the hot gases passing through boiler discharge conduit 156 is directed to recirculation conduit 140 which, as previously discussed, conveys these gases back to secondary combustor 114. The remaining hot gases discharged from the boiler (which are at 350° F. as indicated at Position K) may be utilized for other purposes such as the drying of wood products. Thus, a third energy output is provided from power plant 110.

It may be desirable to position a blower (not shown) in boiler discharge conduit 156 in order to regulate the flow of the hot gases from boiler 126. However, regardless of whether or not a boiler discharge conduit blower is included, blowers 134 and 141 and pump 154 serve to control the flow of fluids through power plant 110 to maximize efficiency of the system.

As previously discussed, the presence of a gas turbine is not absolutely necessary for achievement of the recited objects of the present invention. Conventional energy absorption means (not shown), such as those previously described, may be substituted for the turbine section depicted in power plants 10 and 110 of the drawings. Of course, in such systems compressor 20 or 120 would be driven by other means, such as steam turbine 28 or 128, or any other engine. However, when the gas turbine is deleted from the system, it should be appreciated that electrical generator 22 or 122 would normally also be deleted. In all other respects the power plant would operate substantially as described hereinabove.

Of course, it should be understood that various changes and modifications of the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. A power plant system comprising:
   compressor means adapted to take in and compress air;
   energy absorption means for taking in energy in the form of hot air, for using a portion of the energy, and for discharging the remainder;
   a primary combustor having a first inlet for receiving exhaust air from said energy absorption means, a second inlet for receiving fuel, and an outlet for discharge of products of combustion;
   a secondary combustor having a first inlet for receiving at least a portion of the products of combustion from said primary combustor, a second inlet for receiving a portion of the products of combustion of said secondary combustor, and an outlet for discharge of the products of combustion of said secondary combustor;
   first conduit means for conveying a portion of the products of combustion of said secondary combustor from said secondary combustor outlet to said second inlet of said secondary combustor; and
   an air heat exchanger within said secondary combustor, said heat exchanger including an inlet for receiving compressed air from said compressor means, heat exchange surface means for conveying heat from the products of combustion within said secondary combustor to the compressed air, and an outlet to direct the compressed, hot air out of said secondary combustor for passage to said energy absorption means.

2. The power plant of claim 1 wherein said secondary combustor is in series with and arranged to receive all of the products of combustion from said primary combustor.

3. The power plant system of claim 1 further comprising:
   a boiler having inlet means for receiving hot gases which include exhaust air from said energy absorption means and the products of combustion of said secondary combustor, outlet means for discharging the hot gases, and steam generation means for conveying heat from the hot gases to water within said boiler and thereby generate steam; and
   a steam turbine which receives the steam from said boiler.

4. The power plant of claim 2 wherein said first conduit means includes means for conveying a portion of the products of combustion of said secondary combustor from said secondary combustor outlet directly to said second inlet of said secondary combustor.

5. The power plant of claim 3 wherein said steam turbine is drivingly connected to said compressor means.

6. An indirect gas turbine power plant comprising:
   a gas turbine including a compressor section and a turbine section;
   primary combustor means for initiating combustion, having a first inlet for receiving exhaust air from said turbine section, a second inlet for receiving fuel, and an outlet for discharge of products of combustion;

secondary combustor means for continuing the combustion of primary combustor products of combustion, having a first inlet for receiving at least a portion of the products of combustion from said primary combustor means, a second inlet for receiving a portion of the products of combustion of said secondary combustor means, and an outlet for discharge of the products of combustion of said secondary combustor means;

first conduit means for conveying a portion of the products of combustion of said secondary combustor means from said secondary combustor outlet to said second inlet of said secondary combustor means; and an air heat exchanger within said secondary combustor means, including an inlet for receiving compressed air from said compressor section, heat exchange surface means for conveying heat from the products of combustion within said secondary combustor means of the compressed air, and an outlet to direct the compressed, hot air out of said secondary combustor means for passage of said turbine section.

7. The power plant of claim 6 wherein said secondary combustor means is in series with and arranged to receive all of the products of combustion from said primary combustor means.

8. The power plant of claim 6 further comprising:
a boiler having inlet means for receiving hot gases which include exhaust air from said turbine section and the products of combustion of said secondary combustor means, outlet means for discharging the hot gases, and steam generation means for conveying heat from the hot gases to water within said boiler and thereby generate steam;
a steam turbine which receives the steam from said boiler; and
electrical generation means driven by said steam turbine.

9. The power plant of claim 8 wherein said first conduit means includes means for conveying the secondary combustor products of combustion from said secondary combustor means to said boiler, and for conveying a portion of the hot gases discharged from said boiler, to said second inlet of said second combustor means.

10. The power plant of claim 8 wherein said first conduit means includes means for conveying a portion of the products of combustion of said secondary combustor from said secondary combustor outlet directly to said second inlet of said secondary combustor.

11. The power plant of claim 10 further comprising second conduit means for conveying a portion of the exhaust air from said turbine section to said primary combustor first inlet, and for conveying the remainder of the exhaust air from said turbine section to said boiler inlet means.

12. The power plant of claim 6 wherein said first conduit means includes means for receiving other exhaust gases and for directing such gases, along with the secondary combustor products of combustion, into said secondary combustor means.

13. An indirect gas turbine power plant comprising:
a gas turbine having a compressor section adapted to take in and compress air, and to discharge the compressed air, and a turbine section adapted to take in the compressed air, absorb energy therefrom, and discharge exhaust air;
first electric generation means drivingly connected to said gas turbine;
a primary combustor adapted to burn particulate fuel, said primary combustor having a first inlet for receiving a portion of the exhaust air from said turbine section, a second inlet for receiving air from the atmosphere, the atmospheric air and the exhaust air combining to form combustion air for said primary combustor, a third inlet for receiving the particulate fuel, and an outlet for discharging products of combustion including partially burned fuel;
a secondary combustor having a first inlet for receiving the products of combustion from said primary combustor, a second inlet for receiving products of combustion of said secondary combustor, and an outlet for discharging the products of combustion;
first conduit means for conveying a portion of the products of combustion from said secondary combustor outlet directly back to said secondary combustor second inlet;
an air heat exchanger within said secondary combustor, said air heat exchanger including an inlet for receiving the compressed air from said compressor section, heat exchange surface means adapted to convey heat from the products of combustion within said secondary combustor to the compressed air, and an outlet to direct the compressed, hot air out of said secondary combustor for passage to said turbine section;
a boiler having a combustion air inlet for receiving hot gases which include the remainder of the exhaust air from said turbine section and the products of combustion of said secondary combustor, outlet means for discharging the hot gases, and steam generation means for conveying heat from the hot gases to water within said boiler and thereby generate steam;
a steam turbine which receives the steam from said boiler; and
second electrical generation means drivingly connected to said steam turbine.

14. A power plant comprising:
a gas turbine having a compressor section adapted to take in and compress air, and to discharge the compressed air, and a turbine section adapted to take in the compressed air, absorb energy therefrom, and discharge exhaust air;
first electric generation means drivingly connected to said gas turbine;
primary combustor means for initiating the combustion of said particulate fuel, said primary combustor means having a first inlet for receiving a portion of the exhaust air from said turbine section, a second inlet for receiving air from the atmosphere, the atmospheric air and the exhaust air combining to form combustion air for said primary combustor means, a third inlet for receiving the particulate fuel, and an outlet for discharging products of combustion;
secondary combustor means for continuing the combustion of primary combustor products of combustion, having a first inlet for receiving the products of combustion from said primary combustor means, a second inlet, and an outlet for discharging the products of combustion;

an air heat exchanger within said secondary combustor means, said air heat exchanger including an inlet for receiving the compressed air from said compressor section, heat exchange surface means adapted to convey heat from the products of combustion within said secondary combustor means to the compressed air, and an outlet to direct the compressed, hot air out of said secondary combustor means for passage to said turbine section;

a boiler having a combustion air inlet for receiving hot gases which include the remainder of the exhaust air from said turbine section and the products of combustion from said secondary combustor means, outlet means for discharging the hot gases, and steam generation means for conveying heat from the hot gases to water within said boiler and thereby generate steam;

a steam turbine which receives the steam from said boiler;

electric generation means driven by said steam turbine; and conduit means for directing a portion of the hot gases from said boiler outlet means to said secondary combustor second inlet.

15. A power plant system comprising:

compressor means adapted to take in and compress air;

energy absorption means for taking in energy in the form of hot air for using a portion of the energy, and for discharging the remainder;

primary combustor means for initiating combustion, having a first inlet for receiving exhaust air from said energy absorption means, a second inlet for receiving fuel, and an outlet for discharge of products of combustion;

secondary combustor means for continuing the combustion of primary combustor products of combustion, having a first inlet for receiving at least a portion of the products of combustion from said primary combustor means, a second inlet for receiving a portion of the products of combustion of said secondary combustor means, and an outlet for discharge of the products of combustion of said secondary combustor means;

first conduit means for conveying a portion of the products of combustion of said secondary combustor means from said secondary combustor outlet of said second inlet of said secondary combustor means; and an air heat exchanger within said secondary combustor means disposed downstream of said first and second secondary combustor inlets, said heat exchanger including an inlet for receiving compressed air from said compressor means, heat exchange surface means for conveying heat from the products of combustion within said secondary combustor means to the compressed air, and an outlet to direct the compressed, hot air out of said secondary combustor means for passage to said energy absorption means.

16. The power plant of claim 15 wherein said secondary combustor means is in series with and arranged to receive all of the products of combustion from said primary combustor.

17. The power plant system of claim 15 further comprising:

a boiler having inlet means for receiving hot gases which include exhaust air from said energy absorption means and products of combustion of said secondary combustor means, outlet means for discharging the hot gases, and steam generation means for conveying heat from the hot gases to water within said boiler and thereby generate steam; and a steam turbine which receives the steam from said boiler.

18. The power plant of claim 17 wherein said first conduit means includes means for conveying the secondary combustor products of combustion from said secondary combustor to said boiler, and for conveying a portion of the hot gases discharged from said boiler, to said second inlet of said secondary combustor.

19. The power plant of claim 17 wherein said steam turbine is drivingly connected to said compressor means.

* * * * *

UNITED STATES PATENT AND TRADEMARK OFFICE
CERTIFICATE OF CORRECTION

PATENT NO. : 4,326,382
DATED : April 27, 1982
INVENTOR(S) : Andrew B. Baardson

It is certified that error appears in the above—identified patent and that said Letters Patent is hereby corrected as shown below:

Column 11, line 22, change "of" to --to--;

Column 11, line 24, change "of" to --to--.

Column 14, line 5, change "of" to --to--.

Signed and Sealed this

Third Day of August 1982

[SEAL]

Attest:

Attesting Officer

GERALD J. MOSSINGHOFF

Commissioner of Patents and Trademarks